(12) United States Patent
Jagadeesha et al.

(10) Patent No.: US 11,531,620 B2
(45) Date of Patent: Dec. 20, 2022

(54) DISTRIBUTED VIRTUAL MEMORY MANAGEMENT FOR DATA PROCESSING NETWORK

(71) Applicant: Arm Limited, Cambridge (GB)

(72) Inventors: Kishore Kumar Jagadeesha, Austin, TX (US); Jamshed Jalal, Austin, TX (US); Tushar P Ringe, Austin, TX (US); Mark David Werkheiser, Austin, TX (US); Premkishore Shivakumar, Austin, TX (US); Lauren Elise Guckert, Austin, TX (US)

(73) Assignee: Arm Limited, Cambridge (GB)

( * ) Notice: Subject to any disclaimer, the term of this patent is extended or adjusted under 35 U.S.C. 154(b) by 93 days.

(21) Appl. No.: 17/212,804

(22) Filed: Mar. 25, 2021

(65) Prior Publication Data

US 2022/0308997 A1    Sep. 29, 2022

(51) Int. Cl.
*G06F 12/0815* (2016.01)
*G06F 12/0831* (2016.01)
*G06F 13/40* (2006.01)

(52) U.S. Cl.
CPC ...... *G06F 12/0815* (2013.01); *G06F 12/0833* (2013.01); *G06F 13/4027* (2013.01); *G06F 2212/1041* (2013.01)

(58) Field of Classification Search
None
See application file for complete search history.

(56) References Cited

U.S. PATENT DOCUMENTS

| | | | | |
|---|---|---|---|---|
| 2003/0009643 | A1* | 1/2003 | Arimilli | G06F 12/0831 711/119 |
| 2007/0055826 | A1* | 3/2007 | Morton | G06F 12/0817 711/E12.027 |
| 2013/0262553 | A1* | 10/2013 | Ito | H04L 67/10 709/201 |
| 2019/0220420 | A1* | 7/2019 | Guim Bernat | G06F 12/0808 |
| 2020/0073749 | A1* | 3/2020 | Xu | G06F 12/0817 |
| 2020/0293445 | A1* | 9/2020 | Ibrahim | G06F 12/0811 |
| 2022/0100672 | A1* | 3/2022 | Apte | G06F 12/0826 |

* cited by examiner

*Primary Examiner* — Kaushikkumar M Patel
(74) *Attorney, Agent, or Firm* — Leveque Intellectual Property Law, P.C.

(57) ABSTRACT

A data processing network includes request nodes with local memories accessible as a distributed virtual memory (DVM) and coupled by an interconnect fabric. Multiple DVM domains are assigned, each containing a DVM node for handling DVM operation requests from request nodes in the domain. On receipt of a request, a DVM node sends a snoop message to other request nodes in its domain and sends a snoop message to one or more peer DVM nodes in other DVM domains. The DVM node receives snoop responses from the request nodes and from the one or more peer DVM nodes, and send a completion message to the first request node. Each peer DVM node sends snoop messages to the request nodes in its domain, collects snoop responses, and sends a single response to the originating DVM node. In this way, DVM operations are performed in parallel.

20 Claims, 6 Drawing Sheets

DISTRIBUTED VIRTUAL MEMORY MANAGEMENT FOR DATA PROCESSING NETWORK

BACKGROUND

A data processing network may include a number of request nodes, such as processing cores, which initiate data transactions. The request nodes are coupled by an interconnect fabric. The request nodes may have access to a shared memory, such as system memory, and may include local memory, such as one or more caches. The data processing system may also include a number of slave nodes that provide endpoints for transactions initiated by the request nodes. A slave may be, for example, a system memory management unit (SMMU) that accesses a system memory or a node that couples to an input/output (I/O) device.

For efficiency, a mechanism is provided by which data stored in the local memory of one request node is accessible by other request nodes. By use of a logical abstraction layer, the local memories, together with other memories such as system memories, may be accessed as a distributed virtual memory (DVM). This reduces the need for a processor to access slower memory or storage and improves system performance.

Since data may be shared and copies of data may be stored at different locations in the data processing network, a coherency protocol is implemented to ensure that data is processed in a consistent order and that out-of-date copies of data are not used. To this end, one or more Home Nodes are used. All accesses to a particular set of memory addresses are conducted through a designated Home Node, enabling the Home Node to act as a point of coherency and serialization for the distributed virtual memory.

Messages are sent via the interconnect fabric. Messages for operations related to management of the DVM, other than read/write operations, may be handled by a DVM node. The DVM node receives a DVM message from a request node, completes the requested action, and returns a response to the originating request node.

For example, the Arm® AMBA® 5 CHI™ on-chip interconnect specification of Arm Limited, specifies a Miscellaneous Node in an interconnect fabric that can operate as a DVM node for handling DVM messages.

As the number of request nodes in a network increases, the DVM node can become a point of congestion for messages in the network. In addition, since requests are processed serially, the time taken to complete a DVM transaction increases as the number of nodes increases, resulting in undesirable latency in the network.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding or analogous elements.

DETAILED DESCRIPTION

Figure 1:
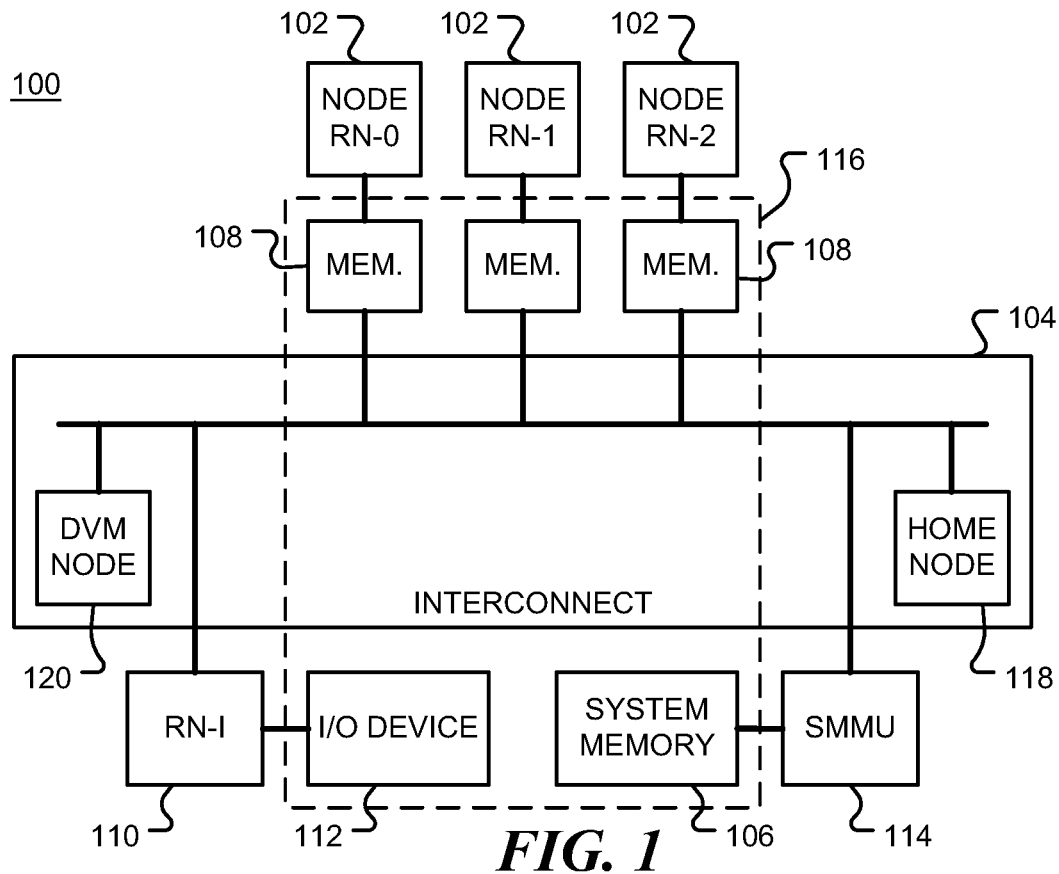
FIG. 1 is a block diagram of a data processing network.

The various apparatus and devices described herein provide mechanisms for handling DVM messages in an interconnect fabric of a data processing network.

While this present disclosure is susceptible of embodiment in many different forms, there is shown in the drawings and will herein be described in detail specific embodiments, with the understanding that the embodiments shown and described herein should be considered as providing examples of the principles of the present disclosure and are not intended to limit the present disclosure to the specific embodiments shown and described. In the description below, like reference numerals are used to describe the same, similar or corresponding parts in the several views of the drawings. For simplicity and clarity of illustration, reference numerals may be repeated among the figures to indicate corresponding or analogous elements.

FIG. 1 is a block diagram of a data processing network 100. In the data processing network, a number of nodes are coupled by an interconnect fabric 104 (also simply referred to as an 'interconnect'). The network nodes include request nodes 102 (RNs) that initiate data transactions. The example shown includes three request nodes, denoted as RN-0, RN-1 and RN-2. Request nodes 102 may be processor cores, processor clusters, accelerators, or other devices. A request node may be a fully coherent master device, for example.

Request nodes 102 may have access to a shared memory, such as system memory 106. A request node may include local memory 108, such as one or more caches or random access memory (RAM). The data processing network may also include other nodes, such as request node RN-I node 110 that couples to an input/output (I/O) device 112, and system memory management unit (SMMU) 114 that accesses system memory 106.

For efficiency, a mechanism is provided by which data stored in the local memory of one request node is accessible by other request nodes. By use of a logical abstraction layer, the local memories, together with other memories such as system memories, may be accessed as a distributed virtual memory (DVM). This reduces the need for a processor to access slower memory or storage and improves system performance. The distributed virtual memory (DVM) is denoted as 116.

Since data may be shared and copies of data may be stored at different locations in the data processing network, a coherency protocol is implemented to ensure that data is processed in a consistent order and that out-of-date copies of data are not used. To this end, one or more Home Nodes 118 are used. All accesses to a particular set of memory addresses are conducted through a designated Home Node, enabling the Home Node to act as a point of coherency and serialization for the distributed virtual memory.

Messages are sent via the interconnect fabric. Messages for operations related to management of the DVM, other than read/write operations, may be handled by a DVM node 120. Such operations include, for example, invalidation of a translation lookaside buffer (TLB) entry, invalidation of a branch prediction, invalidation of an entry in a cache for physical instructions, invalidation of an entry in a cache for virtual instructions, and synchronization of operations. DVM node 120 receives DVM messages from request nodes, completes the required action, and returns a response to the requesting node.

For example, the Arm® AMBA® 5 CHI™ on-chip interconnect specification of Arm Limited, specifies a Miscellaneous Node in an interconnect fabric that can operate as a DVM node for handling DVM messages.

Figure 2:
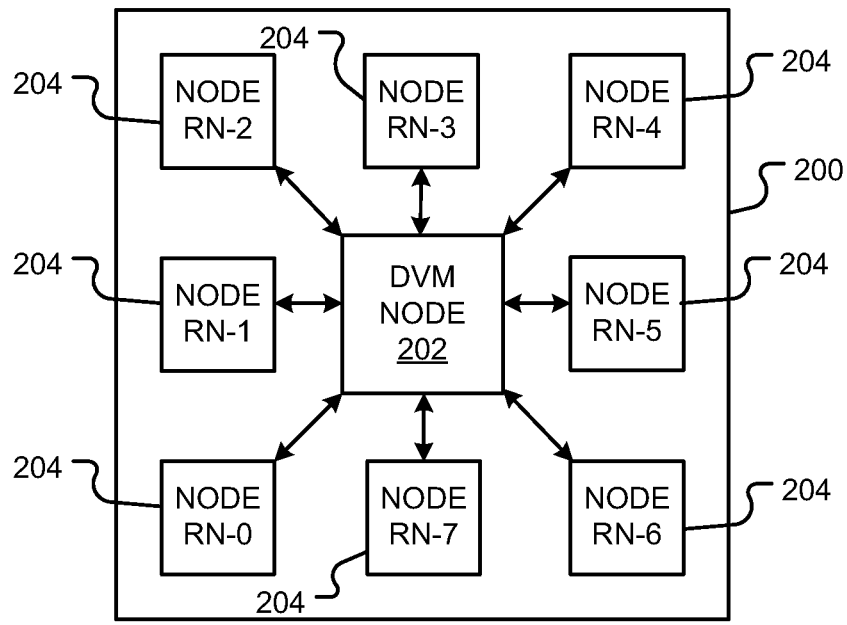
FIG. 2 is a block diagram of a logical arrangement of nodes in a data processing network with a single DVM node.

FIG. 2 is a block diagram of a logical arrangement of nodes in a data processing network 200. A single DVM node 202 is responsible for receiving requests from all request nodes 204 (RN-0, RN-1, . . . , RN-7), ordering the requests and distributing the requests as snoop messages to all the other request nodes and memory management units in the network. While eight request nodes are shown in FIG. 2, a system may contain any number of request nodes. Thus, DVM node 202 creates a messaging bottleneck that becomes more severe as the number of request nodes increases.

Figure 3:
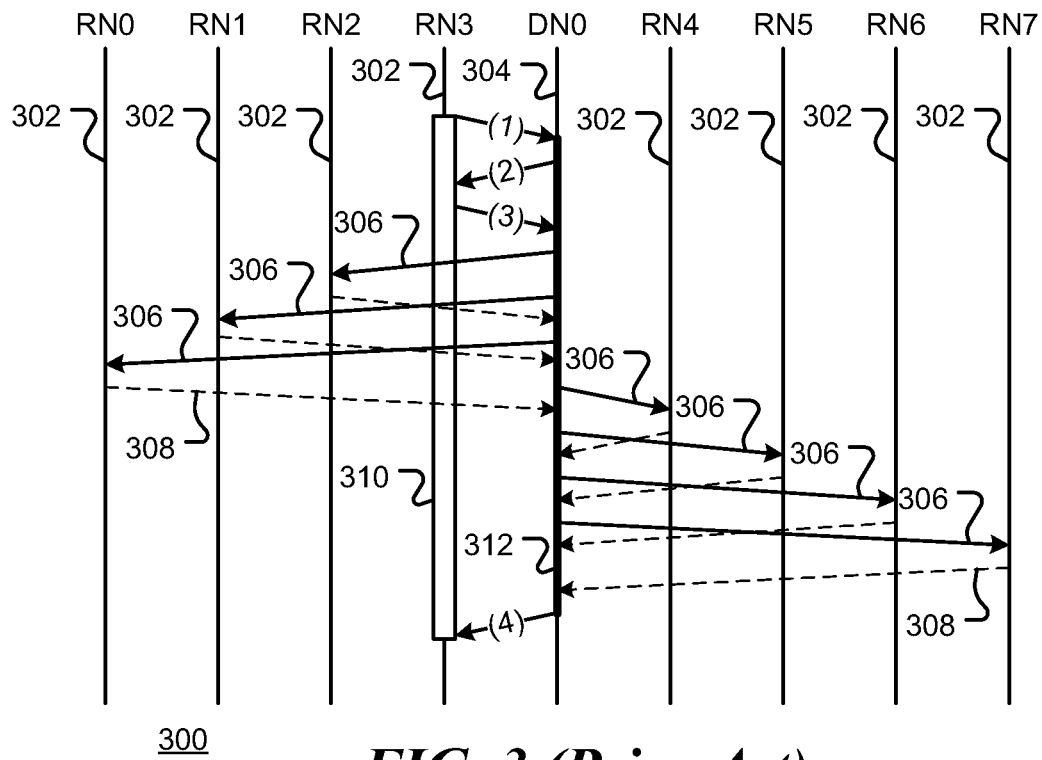
FIG. 3 is a transaction diagram for DVM message flow in a data processing network with a single DVM node.

FIG. 3 is a transaction diagram 300 for a method for DVM message flow in a data processing network with a single DVM node. FIG. 3 shows time lines 302 for request nodes RN-0, RN-1, . . . , RN-7 and timeline 304 for DVM node DN0, with time flowing downwards. In a DVM message denoted by arrow (1), RN3 sends a message to the DVM node DN0. The message indicates that RN3 wishes to request a DVM operation. As denoted by arrow (2), the DVM node sends a message to RN3 to indicate that resources are available to receive the DVM message. In the message denoted by arrow (3), RN3 completes the request for the DVM operation. The DVM node DN0 then sends snoop messages, specifying the request for the DVM operation to other request nodes in the network as indicated by arrows 306. A snoop message, indicated by arrows 306, may be sent as one or more flits on a snoop channel. For example, when an address field in a snoop flit is not wide enough, the snoop message may be sent in two parts, using two flits on the snoop channel.

Each request node responds to the snoop message by sending a snoop response to the DVM node DN0, as indicated by broken-line arrows 308. Finally, the DVM node DN0 sends message (4) to the originating request node (RN3) to indicate completion of the requested DVM message.

Having a single node for handling requests for DVM operations leads to the following performance issues:

I. All the request nodes in a chip send DVM messages to the single DVM node, creating a bottleneck on the request channel and straining DVM node structural resources.
  II. A single DVM node is responsible for sending snoop messages to all the other request nodes. This creates congestion in the snoop interface.
  III. All the snoop messages are serialized, increasing the duration of the DVM operation, as indicated by the thickened part 310 of the timeline for RN3.
  IV. The DVM node is utilized for a long duration, as indicated by the thickened part 312 of the timeline for DVM node DN0.

For example, in a system with 64 request nodes and only one DVM node, 126 cycles are need to send the snoop messages, assuming two flits (two cycles) are required for each message.

In accordance with embodiments of the disclosure, a data processing network is provided that includes request nodes with local memories accessible as a distributed virtual memory (DVM) and coupled by an interconnect fabric. Multiple DVM domains are assigned, each containing a DVM node for handling DVM operation requests from request nodes assigned to the domain. On receipt of a request, a DVM node sends a snoop message to other request nodes in its domain and sends a snoop message to one or more peer DVM nodes in other DVM domains. The DVM node receives snoop responses from the request nodes, and from the one or more peer DVM nodes, and send a completion message to the first request node. Each peer DVM node sends snoop messages to the request nodes in its own domain, collects snoop responses, and sends a single response to the originating DVM node. In this way, DVM operations are performed in parallel.

Figure 4:
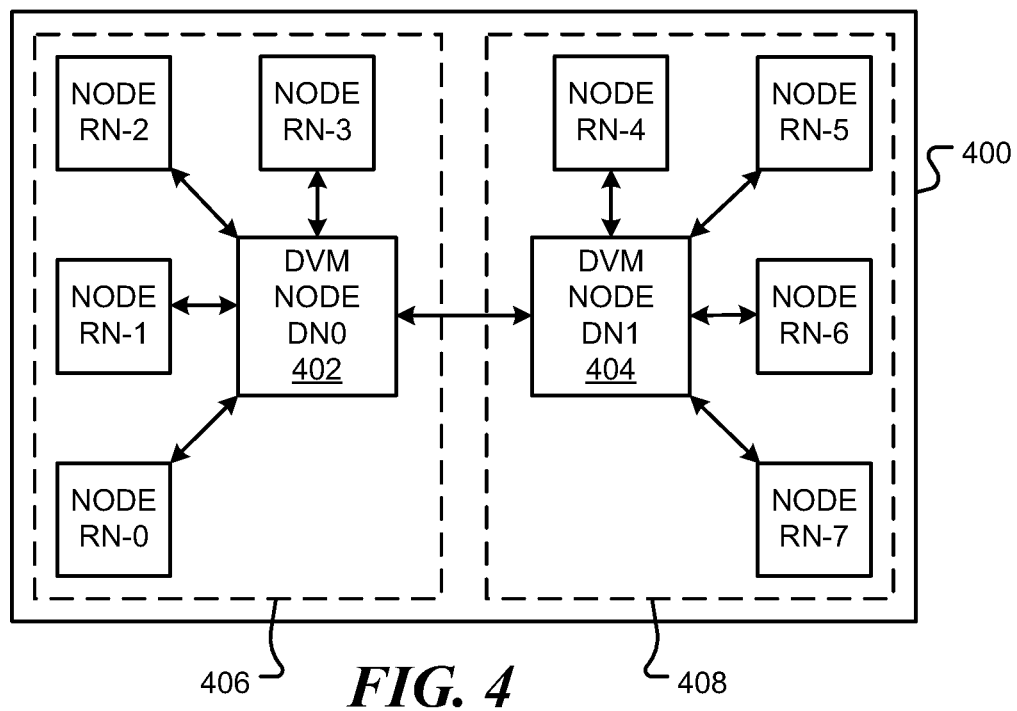
FIG. 4 is a block diagram of a data processing network in accordance with various representative embodiments.

FIG. 4 is a block diagram of a data processing network in accordance with various embodiments of the disclosure. The data processing network is implemented in a chip 400 and includes multiple DVM nodes. Each DVM node is associated with a group of request nodes in the chip. The group of request nodes is a subset of the request nodes in the chip. The logical group containing the request nodes and the associated DVM node is referred to herein as a DVM domain. All request nodes in a DVM domain send DVM message to the DVM node in that domain. A DVM domain is a logical or operational grouping of elements. The request nodes in a DVM domain are not required to be physically grouped. The associations between request nodes and DVM nodes may be fully programmable, enabling a system to be optimized for different workloads if desired.

In the example shown in FIG. 4, the network includes DVM node 402 (DN0) and DVM node 404 (DN1). DVM node 402 is associated with request nodes RN-0, RN-1, RN-2 and RN-3 that, together, form first DVM domain 406. DVM node 404 is associated with request nodes RN-4, RN-5, RN-6 and RN-7 that, together, form second DVM domain 408. Responsibility for handling DVM messages from request nodes in the first DVM domain lies with DN0, while responsibility for handling DVM messages from request nodes in the second DVM domain lies with DN1. Each DVM node is responsible for receiving DVM messages from request nodes in its domain, ordering them, and distributing them to other request nodes in the domain. In this way, DVM operations are performed in parallel. This provides increased throughput and reduced latency compared with a network that uses a single DVM node. The approach may be scaled for use in larger systems.

Figure 5:
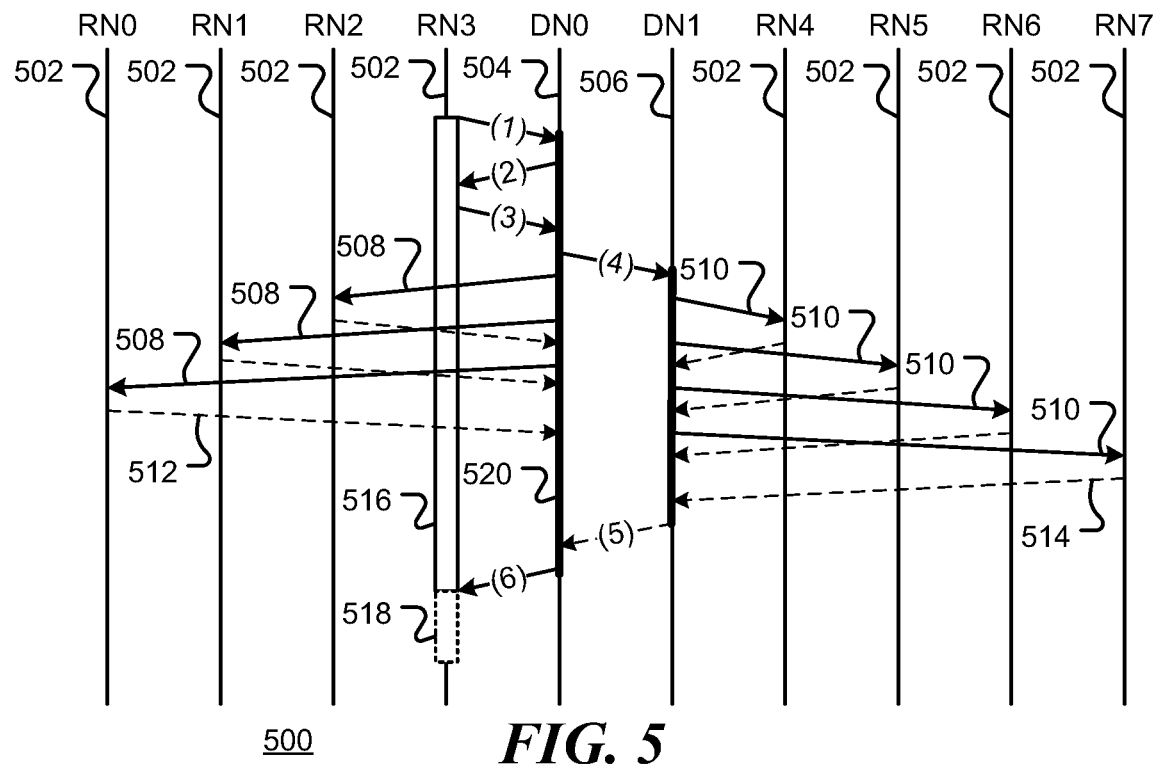
FIG. 5 is a transaction diagram for DVM message flow in a data processing network with multiple DVM nodes, in accordance with various representative embodiments.

FIG. 5 is a transaction diagram 500 for a method for DVM message flow in a data processing network with multiple DVM nodes, in accordance with various embodiments of the disclosure. In this simplified example, the data processing network is configured as shown in FIG. 4, with two DVM domains, each having a DVM node and four request nodes. FIG. 5 shows timelines 502 for request nodes RN-0, RN-1, . . . , RN-7, timeline 504 for first DVM node DN0 and timeline 506 for second DVM node DN1, with time flowing downwards. In the example transaction shown, RN3 sends a message, denoted by arrow (1), to the DVM node DN0, since RN-3 is in the domain of DN0. The message indicates the RN3 wishes to request a DVM operation. As denoted by arrow (2), the DVM node sends a message (denoted as DataBufferID, for example) to RN3 to indicate that resources are available to receive the DVM message. In the message denoted by arrow (3), RN3 completes the request for the DVM operation.

Message (1) may include a first part of a DVM message sent on a request channel. For example, the first part of the DVM message may include a DVM request with associated attributes. Message (3) may include a second part of the DVM message sent as a data flit on a data channel. The second part of the DVM message may include a target address for the DVM operation. The second part may be a "NonCopyBackWriteData" instruction for example, indicating the data should not be written back to the memory. DVM node DN0 then sends snoop messages, specifying the request DVM operation to other request nodes (RN0, RN1 and RN2) in its DVM domain, as indicated by arrows 508. A snoop message (referred to as a "SnpDVM" message) may be sent as one or more flits, depending upon the size of the message and the size of the snoop request channel in the interconnect. DN0 collects the snoop response 512 from the request nodes in its domain.

DVM node DN0 also forwards the DVM message to other DVM nodes in the chip. These nodes are referred to herein as 'peer DVM nodes'. In the example shown in FIG. 5, the DVM message is forwarded to peer DVM node DN1, as indicated by arrow (4). Peer DVM node DN1 sends snoop messages to request nodes (RN4, RN5, RN6 and RN7) in its DVM domain as indicated by arrows 510 and collects the resulting snoop responses 514.

Peer DVM node DN1 then sends a single snoop response, indicated by arrow (5), to the initiating DVM node, DN0. Finally, the initiating DVM node DN0 sends message (6) to the originating request node (RN3) to indicate completion of the requested DVM operation message.

The duration of the transaction, as viewed by the originating node RN3, is indicated by box 516. This duration is shorter than the corresponding duration by an amount indicated by box 518. While this saving is relatively small in the simple example shown, the saving increases as the size of the network increases. In addition, the duration of the transaction as viewed by the DVM nodes (indicated by the thickened parts of the timelines) is also shortened. This leads to higher throughput because of better tracker utilization in the DVM nodes (i.e. the DVM nodes need to track the transaction for a shorter time).

TABLE 1 shows the average lifetime of DVM messages in DVM nodes in a data processing network with 32 request nodes. The table indicates that significant resource saving is achieved when multiple DVM nodes are used compared with using a single DVM node.

TABLE 1

| Number of DVM nodes | Average message lifetime of message in DVM nodes (in cycles) | Improvement |
| --- | --- | --- |
| 1 DN | 62 | Baseline |
| 2 DN | 32 | 48% |
| 4 DN | 17 | 73% |
| 8 DN | 9.5 | 85% |

TABLE 2 shows the performance improvement for an example where the DVM message is an Instruction Cache Invalidation (ICI) request. The example assumes that each ICI is for 64 Bytes, that the interconnect fabric operates at 2 GHz, and that the network includes 32 request nodes.

TABLE 2

| Number of DVM Nodes | ICI performance (GigaBits per second) |
| --- | --- |
| 1 | 2.1 |
| 2 | 4 |
| 4 | 7.5 |
| 8 | 13.5 |

Figure 6:
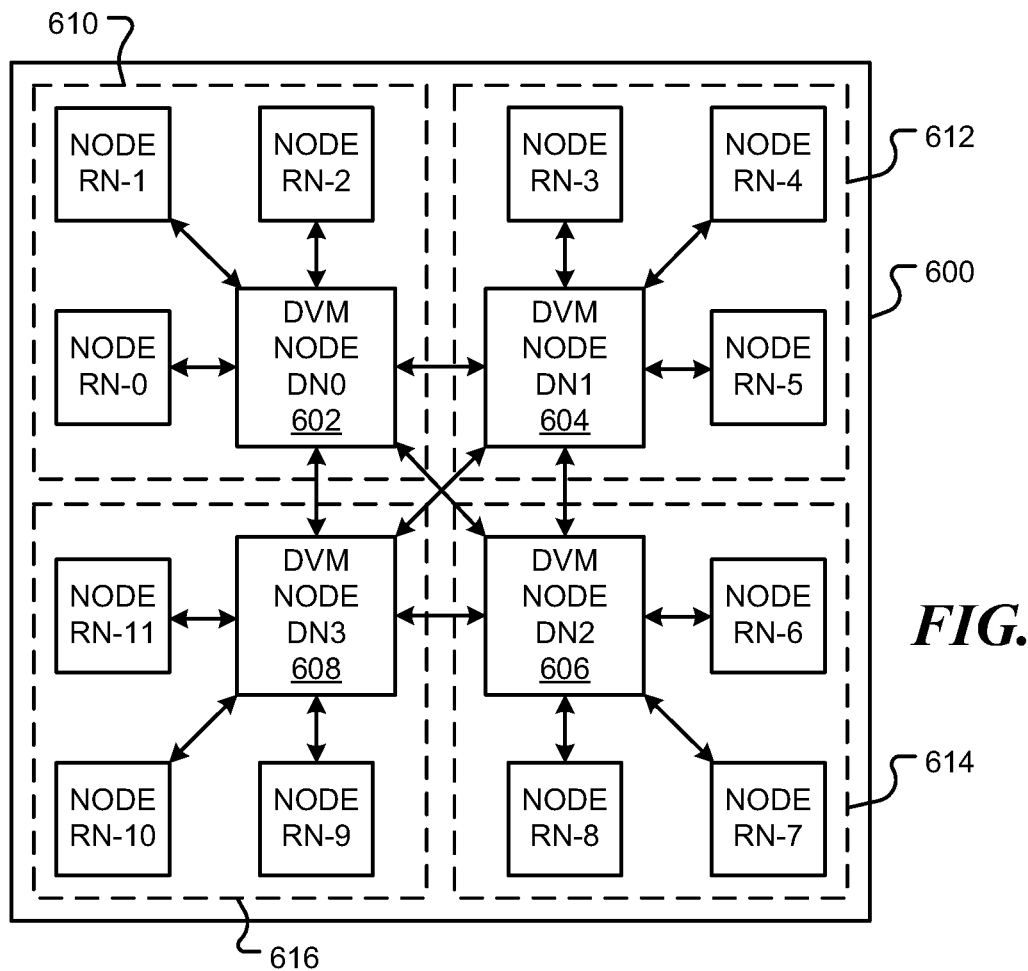
FIG. 6 is a block diagram of a data processing network, in accordance with various representative embodiments.

FIG. 6 is a block diagram of a data processing network in accordance with various embodiments of the disclosure. The data processing network is implemented in a chip 600 and includes multiple DVM nodes. The network includes four DVM nodes: 602 (DN0), 604 (DN1), 606 (DN2) and 608 (DN3). DVM node 602 is associated with request nodes RN-0, RN-1 and RN-2 which, together, form first DVM domain 610. DVM node 604 is associated with request nodes RN-3, RN-4 and RN-5 which, together, form second DVM domain 612. DVM node 606 is associated with request nodes RN-6, RN-7 and RN-8 which, together, form third DVM domain 614. DVM node 608 is associated with request nodes RN-9, RN-10 and RN-11 which, together, form fourth DVM domain 616. Responsibility for handling DVM messages from request nodes in each DVM domain lies with the DVM node of that domain. Each DVM node is responsible for receiving DVM messages from request nodes in its domain, ordering them, and distributing them to other request nodes in the domain. In this way, DVM operations are performed in parallel.

The DVM nodes are operatively coupled to each other. When a first DVM node receives a DVM message from a request node is its domain, it forwards to the message to the three other DVM nodes (its peer DVM nodes). The peer DVM nodes snoop request nodes in their respective domains, collect snoop responses, and each peer DVM node sends a single response to the originating DVM node.

A DVM node can receive forwarded DVM messages from any or all of its peer DVM nodes. In one embodiment, to avoid congestion, the number of DVM messages that a DVM node can have outstanding at any time is limited to a designated maximum. In addition, a DVM node is provided with sufficient resources to be able to receive or sink DVM messages received from all of its peer DVM nodes. Each DVM node is configured to have sufficient resources to guarantee forward progress of at least one synchronous DVM message and one non-synchronous DVM message from peer DVM nodes.

In order to avoid deadlocks due the presence of multiple DVM nodes, a DVM node may block synchronization requests from other DVM nodes. In one embodiment, when multiple request nodes send DVM synchronization requests to the DVM node in their respective domain, the DVM node is configured to dispatch no more than one synchronization request to the request nodes in its domain and to other DVM nodes. Each of the other DVM nodes, when it receives a synchronization request DVMSYNCs from other DVM nodes and from request nodes in its own domain, is configured to dispatch no more than one synchronization request to its domain.

In a further embodiment of the disclosure, the mechanisms described above are extended for use in multi-chip systems. Multi-chip systems use nodes referred to as chip-to-chip gateways (CCGs) to send transaction requests to the other chips and to receive transaction requests from them. To enable chip-to-chip DVM messaging, the CCG is assigned to one of the DVM domains.

Figure 7:
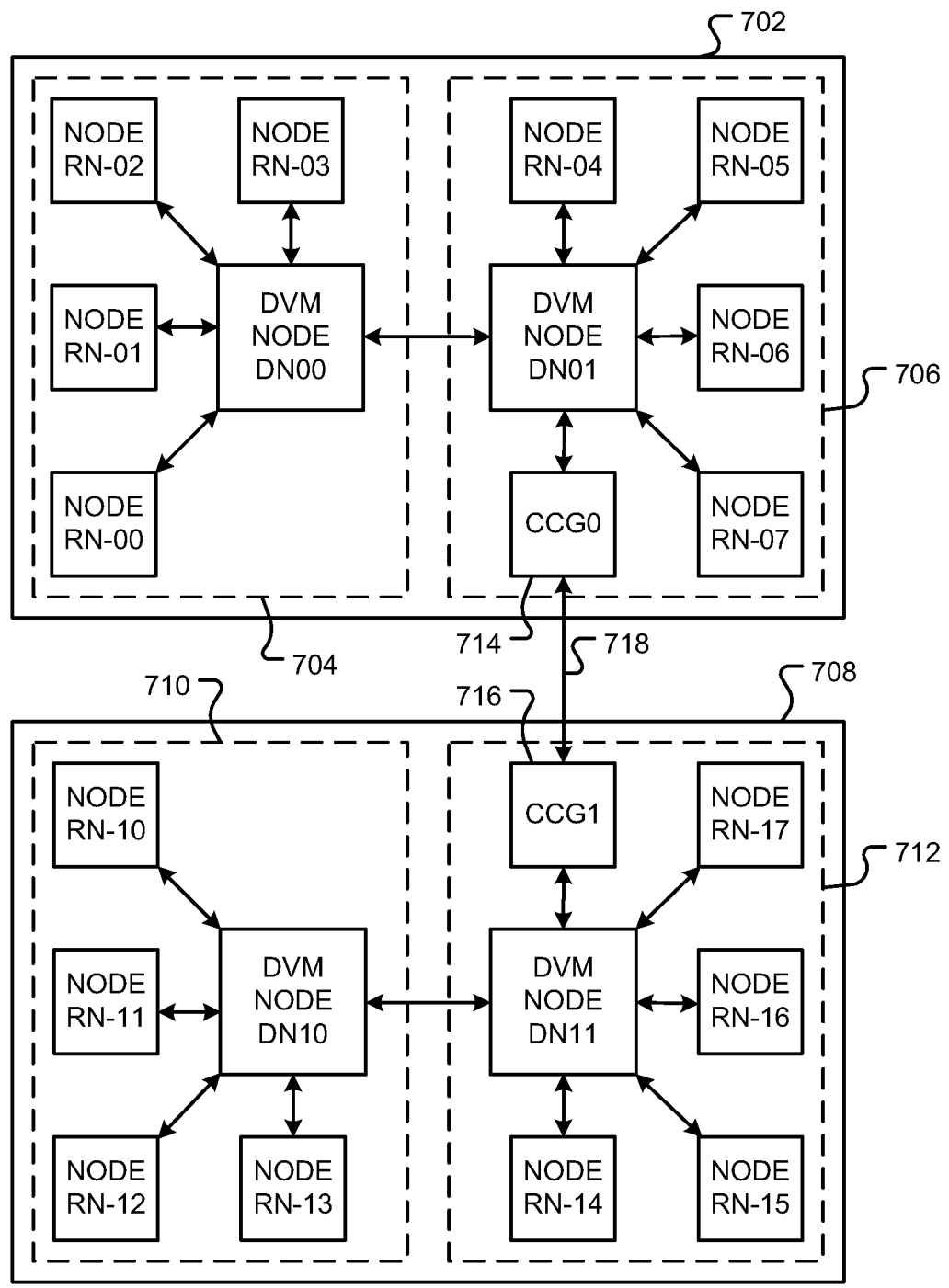
FIG. 7 is a block diagram of a data processing network that includes two chips, in accordance with various representative embodiments.

FIG. 7 is a block diagram of a data processing system 700 that includes two chips, consistent with various embodiments of the disclosure. Chip 0 (702) is configured to have two DVM domains, DVM domain 704 with DVM node DN00 and request nodes RN-00, RN-01, RN-02 and RN-03, and DVM domain 706 with DVM node DN01 and request nodes RN-04, RN-05, RN-06 and RN-07. Chip 1 (708) is configured to have two DVM domains, DVM domain 710 with DVM node DN10 and request nodes RN-10, RN-11, RN-12 and RN-13, and DVM domain 712 with DVM node DN11 and request nodes RN-14, RN-15, RN-16 and RN-17.

Chip 0 (702) also includes chip-to-chip gateway CCG0 (714) that is assigned to DVM domain 706. Chip 1 (708) also includes chip-to-chip gateway CCG1 (716) that is assigned to DVM domain 712.

In an example DVM operation shown, request node RN-00 sends a DVM request to the DVM node, DN00, in its domain. DN00 sends snoop requests to all request nodes and any CCG in the domain (RN-01, RN-02 and RN-03 in this example) and to peer DVM node DN01. DN01 sends snoop requests to all request nodes and any CCG in its domain (RN-05, RN-06, RN-07, RN-08 and CCG0 (714) in this example). Chip-to-chip gateway CCG0 (714) forwards the request to the chip-to-chip gateway node CCG1 (716) on chip 1 (708) via link 718 and CCG1 (716) passes the request to the DVM node (DN11) in its domain. The DVM node treats this in the same manner as a request from a request node and snoop requests are propagated to all request nodes on chip 1 (708), as described above. Responses to snoop requests are collected and returned to the original request node via the CCGs 716 and 714 and the DVM nodes.

As illustrated by the examples described above, the present disclosure provides a method for managing distributed virtual memory (DVM) in a data processing network having multiple request nodes and multiple DVM nodes. The distributed virtual memory may include system memory and local memories associated of the plurality of request nodes. The method includes assigning a plurality of DVM domains, each DVM domain including a DVM node and one or more request nodes. In operation, a first request node, assigned to a first DVM domain that includes a first DVM node, sends a DVM message to request a DVM operation to the first DVM node. The first DVM node sends a snoop message to request nodes, other than the first request node, in the first DVM domain and also sends snoop messages to peer DVM nodes in DVM domains other than the first DVM domain. The first DVM node collects snoop responses from the request nodes in the first DVM domain (other than the first request node) and snoop responses from each peer DVM node and sends a completion message to the first request node.

Each peer DVM node sends a snoop message to request nodes in the DVM domain of the peer DVM node, collects snoop responses from the request nodes in the DVM domain of the peer DVM node and sends a snoop response to the first DVM node. A request node receiving a snoop message may, for example, invalidate data in its local memory of the request node in response. More generally, a request node in the first DVM domain receives, from the first DVM node, a snoop message specifying a DVM operation and then performs the requested DVM operation. If the request is for an asynchronous DVM operation, a snoop response may be sent to the first DVM node before completing the requested DVM operation. For a synchronous DVM operation, the snoop response is sent to the first DVM node after completing of the requested DVM operation.

DVM operations include, for example, invalidation of an entry in an address translation table, invalidation of an entry in an instruction cache, invalidation of a predictor, DVM synchronization, etc.

In one embodiment, the first DVM node sends a buffer identifier message (DBID message) to the first request node in response to receiving the DVM message from the first request node. The buffer identifier message identifies an available buffer of the first DVM node for storing the DVM message. The first request node then sends a target address in the distributed virtual memory to the DVM node. Snoop messages, sent to the request nodes in the DVM domain of the first DVM node and to each peer DVM node, include this target address.

The message sent by the first request node may include a first part of the DVM message that is sent in an address flit on a request channel. The first part of the DVM message includes a DVM op-code and associated attributes. In response to receiving the first part of the message, the first DVM node replies with a message identifying an available message buffer of the first DVM node. The first request node then sends a second part of the DVM message in a data flit on a data channel. The second part of the DVM message includes a target address for the DVM operation.

A snoop message may be sent in two parts. A first part of the snoop message is sent on a snoop channel and includes a transaction identifier (TXID), DVM op-code for the DVM operation, and a first part of a target address for the DVM operation. The second part of the snoop message, also sent on the snoop channel, includes the TXID and a second part of the target address for the DVM operation. The parts of the snoop message may arrive out of order.

Thus, as described above, a DVM node in a first DVM domain of the first integrated circuit is configured to send a snoop message for the DVM operation to a DVM node of a second integrated circuit, where the snoop message is sent via the first chip-to-chip gateway of the first integrated circuit and a second chip-to-chip gateway of the second integrated circuit. The DVM node of the first integrated circuit is also configured to receive a snoop response from the DVM node of the second integrated circuit, via the second chip-to-chip gateway and the first chip-to-chip gateway, to indicate completion of the DVM operation by request nodes in the second integrated circuit.

The DVM node of the second domain is configured to receive the snoop message from the DVM node of the first integrated circuit, send a snoop message for the DVM operation to second request nodes of the second integrated circuit, collect snoop responses from the second request nodes of the second integrated circuit, and send a single snoop response the DVM node of the first integrated circuit, via the second chip-to-chip gateway and the first chip-to-chip gateway, to indicate completion of the DVM operation by the second request nodes in the second integrated circuit.

Figure 8:
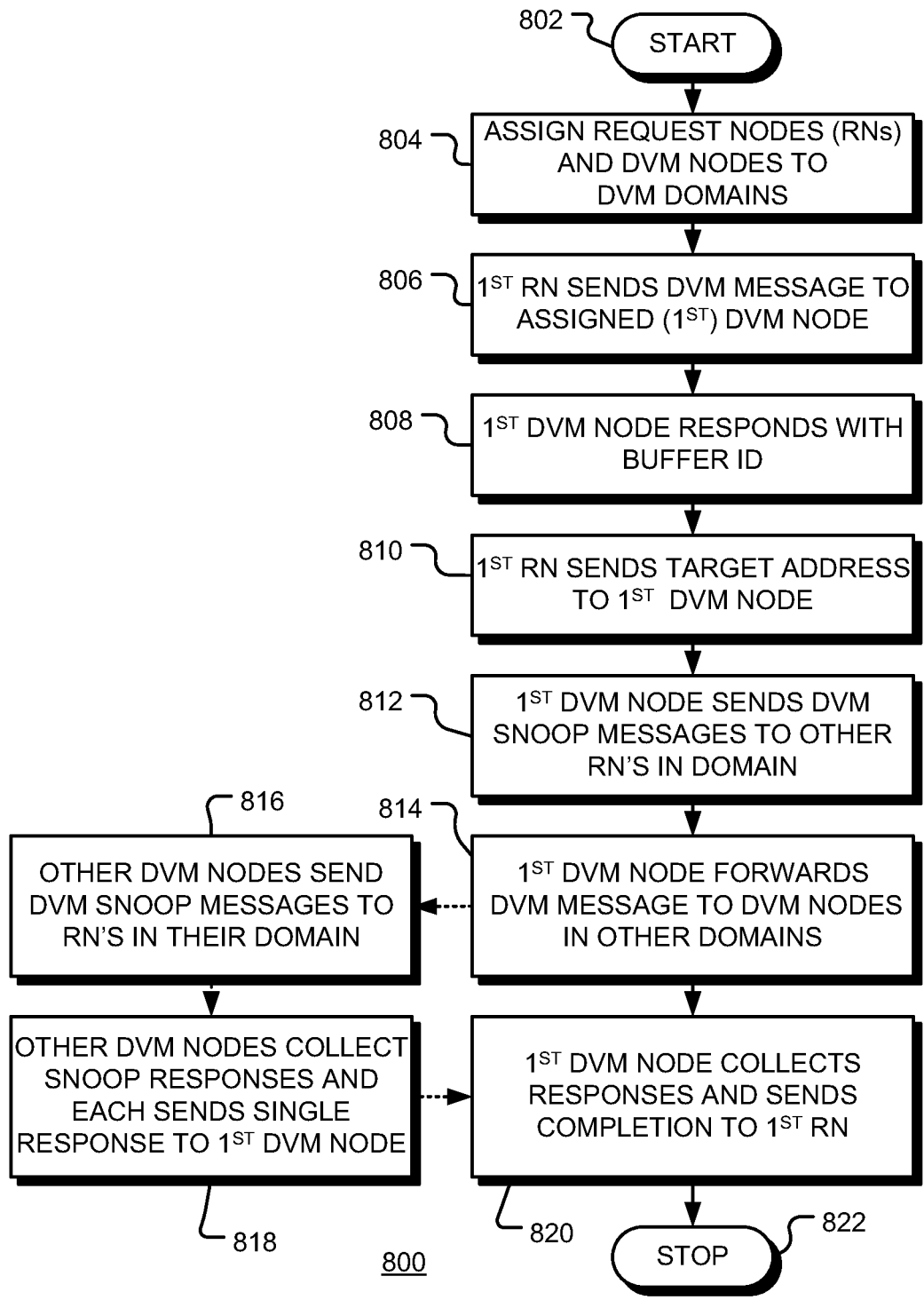
FIG. 8 is a flow chart of a method for DVM management, in accordance with various representative embodiments.

FIG. 8 is a flow chart 800 of a method for DVM management, in accordance with various representative embodiments. Following start block 802 in FIG. 8, request nodes (RNs) and DVM nodes are assigned to DVM domains at block 804. The assignment may be programmed by a user, for example. In an example DVM operation, a first request node sends a DVM message to the DVM node (referred to as the first DVM node) assigned to its domain at block 806. The message may be sent on a request channel of the interconnect fabric, for example. At block 808, the first DVM node responds, with a buffer ID for example, indicating that it is ready to receive data from the first request node. At block 810, the first request node sends the data for the DVM operation to the first DVM node. The data may include, for example, a memory address for the DVM operation and may be sent on a data channel of the interconnect fabric. At block 812, the first DVM node sends DVM snoop messages to the request nodes (other than the first request node) in its domain. At block 814, the first DVM node forwards the DVM message to DVM nodes in other domains. In turn, at block 816, the other DVM nodes send DVM snoop messages to the request nodes in their domains. The other DVM nodes collect responses to the DVM snoop messages at block 818 and send a single completion message back to the first DVM node. At block 820, the first DVM node collects response from other DVM nodes, and from request nodes in its domain, and sends a completion message to the first request node. This completes the DVM operation, as indicated by termination block 822.

The use of multiple DVM domains provides an increased throughput of DVM messages by processing multiple DVM messages in the same cycle and sending DVM snoop messages in parallel. In addition, DVM operation latency is reduced. A data processing system may have any number of DVM nodes in the interconnect fabric. Any number of request nodes, memory management units and chip-to-chip gateways may be assigned to a DVM domain. Since fewer request nodes send messages to each of the DVM nodes, the pressure on request channel at each DVM nodes is reduced. In turn, this reduces congestion in the snoop message interface, since a DVM node only sends snoop messages to request nodes its domain and to other DVM nodes.

Figure 9:
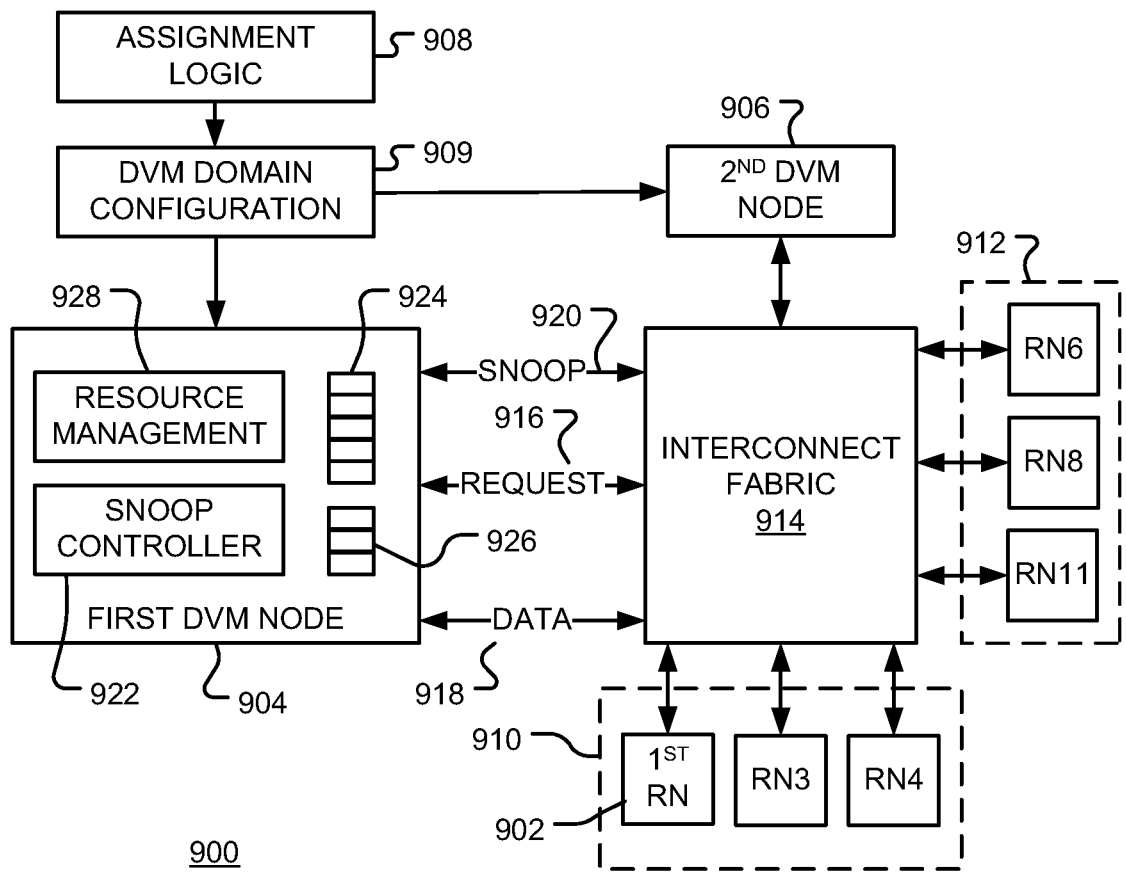
FIG. 9 is a block diagram of a data processing network, in accordance with various representative embodiments.

FIG. 9 is a block diagram of a data processing network 900 in accordance with embodiments of the disclosure. The network 900 includes multiple request nodes including a first request node 902 and other request nodes RN3, RN4, RN11, RN 8 and RN6. Each request node includes a local memory, such as cache, for example. The local memories of the request nodes, plus any shared memories, are accessible as a distributed virtual memory (DVM). Network 900 also includes a number of DVM nodes, such as first DVM node 904 and second DVM node 906. The local memory of a request node is accessible by other request nodes via one or more DVM nodes. Network 900 includes assignment logic 908 configured to assign one or more request nodes to each DVN node to form a DVM domain for each DVM node. In the example shown, the first request node and request nodes RN3 and RN4 are assigned to first DVM node 904. Thus, the group of request nodes 910 and the first DVM node 904 form a first DVM domain. Request nodes RN6, RN8 and RN11 are assigned to second DVM node 906. Thus, the group of request nodes 912 and the second DVM node 906 form a second DVM domain. The domain assignments may be recorded in DVM domain configuration table 909. The table may be accessed by request nodes and DVM nodes to identify other members of their domain.

Network 900 also includes interconnect fabric 914 that couples the one or more request nodes in each DVM domain to the DVM node in the DVM domain. The interconnect fabric also couples the DVM nodes. In one embodiment, interconnect fabric 914 includes request channel 916, data channel 918 and snoop channel 920.

When first request node 902 sends a DVM message to first DVM node 904 to request a DVM operation, the first DVM node 904 sends a snoop message to request nodes 910 and sends a snoop message on snoop channel 920 to the second DVM node 906 (and any other peer DVM nodes in the network). The first DVM node 904 receives snoop responses from request nodes 910 and receives snoop responses from the second DVM node 906 (and any other DVM nodes in the network). The first DVM node 904 then sends a completion message to first request node 902.

Snoop messages are handled in the first DVM node 904 by snoop controller 922.

The first DVM node 904 includes first message buffer 924 for storing one or more DVM messages received from request nodes in its DVM domain, and second message buffer 926 for storing snoop messages received from peer DVM nodes in other DVM domains. Resources of the DVM node, such as the first and second message buffers 924, 926, are managed by resource manager 928. The first DVM node 904 is configured to send a buffer identifier message to the first request node 902 in response to receiving the DVM message from the first request node 902 on request channel 916. The buffer identifier message identifies an available first buffer of the first DVM node 904.

First request node 902 is configured to send a target address in the distributed virtual memory to the DVM node 904 in response to receiving the buffer identifier message from the DVM node 904. The target address may be sent on data channel 918. Snoop messages, sent to the request nodes in the first DVM domain and to second DVM node 906, include the target address.

Second DVM node 906, which is a peer DVM node, is configured to send a snoop message to request nodes in its domain. In the example shown, request nodes RN6, RN8 and RN11 are in the domain of second DVM node 906. Second DVM node 906 collects snoop responses from the request nodes in its DVM domain, and sends a snoop response to first DVM node 904.

In one embodiment, the request nodes, the DVM nodes, assignment logic 908 and interconnect fabric 914 are fabricated in a first integrated circuit. The first integrated circuit may include a first chip-to-chip gateway, as shown in FIG. 7, for example.

In order to avoid deadlock or congestion in the data processing network, a DVM node may be configured to restrict the number of outstanding snoop messages sent to peer DVM nodes. In addition, a DVM node may be configured to receive DVM messages for synchronous DVM operations from multiple request nodes in the first DVM domain, but restricted to send snoop messages for the synchronous DVM operations one at a time to request nodes and peer DVM nodes.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or", as used herein, is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

As used herein, the term "configured to", when applied to an element, means that the element may be designed or constructed to perform a designated function, or has the required structure to enable it to be reconfigured or adapted to perform that function.

Numerous details have been set forth to provide an understanding of the embodiments described herein. The embodiments may be practiced without these details. In other instances, well-known methods, procedures, and components have not been described in detail to avoid obscuring the embodiments described. The disclosure is not to be considered as limited to the scope of the embodiments described herein.

Those skilled in the art will recognize that the present disclosure has been described by means of examples. The present disclosure could be implemented using hardware component equivalents such as special purpose hardware and/or dedicated processors which are equivalents to the present disclosure as described and claimed. Similarly, dedicated processors and/or dedicated hard wired logic may be used to construct alternative equivalent embodiments of the present disclosure.

Dedicated or reconfigurable hardware components used to implement the disclosed mechanisms may be described, for example, by instructions of a hardware description language (HDL), such as VHDL, Verilog or RTL (Register Transfer Language), or by a netlist of components and connectivity. The instructions may be at a functional level or a logical level or a combination thereof. The instructions or netlist may be input to an automated design or fabrication process (sometimes referred to as high-level synthesis) that interprets the instructions and creates digital hardware that implements the described functionality or logic.

The HDL instructions or the netlist may be stored on non-transient computer readable medium such as Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present disclosure. Such alternative storage devices should be considered equivalents.

Various embodiments described herein are implemented using dedicated hardware, configurable hardware or programmed processors executing programming instructions that are broadly described in flow chart form that can be stored on any suitable electronic storage medium or transmitted over any suitable electronic communication medium. A combination of these elements may be used. Those skilled in the art will appreciate that the processes and mechanisms described above can be implemented in any number of variations without departing from the present disclosure. For example, the order of certain operations carried out can often be varied, additional operations can be added or operations can be deleted without departing from the present disclosure. Such variations are contemplated and considered equivalent.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A method for managing distributed virtual memory (DVM) in a data processing network having a plurality of request nodes and a plurality of DVM nodes, the distributed virtual memory associated with local memories of the plurality of request nodes, the method comprising:
assigning a plurality of DVM domains, each DVM domain including a DVM node of the plurality of DVM nodes and one or more request nodes of the plurality of request nodes, the plurality of DVM nodes including a first DVM node in a first DVM domain;
sending, by a first request node in the first DVM domain to the first DVM node, a DVM message to request a DVM operation;
the first DVM node, responsive to receiving the DVM message:
sending a snoop message to request nodes, other than the first request node, in the first DVM domain;
sending snoop messages to peer DVM nodes in DVM domains other than the first DVM domain; and
sending a completion message to the first request node in response to receiving snoop responses from the request nodes, other than the first request node, in the first DVM domain and receiving a snoop response from each peer DVM node.

2. The method of claim 1, further comprising each peer DVM node:
sending a snoop message to request nodes in at of the peer DVM node;
collecting snoop responses from the request nodes in the DVM domain of the peer DVM node; and
sending a snoop response to the first DVM node.

3. The method of claim 1, further comprising:
a request node, other than the first request node, invalidating data in a local memory of the request node in response to receiving a snoop message.

4. The method of claim 1, further comprising a request node in the first DVM domain:
receiving a snoop message the first DVM node specifying the DVM operation;
performing the DVM operation;
for an asynchronous DVM operation:
sending a snoop response to the first DVM node before completing the requested DVM operation; and
for a synchronous DVM operation:
sending a snoop response to the first DVM node after completing the requested DVM operation.

5. The method of claim 1, where the DVM operation includes:
invalidation of an entry in an address translation table;
invalidation of an entry in an instruction cache;
invalidation of a predictor; or
DVM synchronization.

6. The method of claim 1, further comprising:
the first DVM node sending a buffer identifier message to the first request node in response to receiving the DVM message from the first request node, the buffer identifier message identifying an available buffer of the first DVM node for storing the DVM message; and the first request node sending a target address in the distributed virtual memory to the DVM node, where the snoop messages sent to the request nodes and the snoop messages sent to each peer DVM node include the target address.

7. The method of claim 1, where sending the DVM message by the first request node includes the first request node:

sending a first part of the DVM message in an address flit on a request channel, the first part of the DVM message including a DVM op-code and associated attributes;

receiving, from the first DVM node, a message identifying an available message buffer of the first DVM node; and sending a second part of the DVM message in a data flit on a data channel, the second part of the DVM message including a target address for the DVM operation.

8. The method of claim 1, where sending a snoop message includes:

sending a first part of the snoop message on a snoop channel, the first part including a transaction identifier (TXID), a DVM op-code for the DVM operation and a first part of a target address for the DVM operation; and sending a second part of the snoop message on the snoop channel, the second part including, the TXID and a second part of the target address for the DVM operation.

9. A data processing network comprising:

a plurality of request nodes, each request node including a local memory, the local memories of the plurality of request nodes accessible as a distributed virtual memory (DVM);

a plurality of DVM nodes, where the local memory of a request node is accessible by other request nodes via one or more DVM nodes of the plurality of DVM nodes;

assignment logic configured to assign one or more request nodes of the plurality of request nodes to each DVM node of the plurality of DVM nodes to form a DVM domain for each DVM node; and an interconnect fabric operatively coupling the one or more request nodes in a DVM domain to the DVM node in the DVM domain and operatively coupling between the DVM nodes, where a first request node in a first DVM domain is configured to send a DVM message to the DVM node of the first DVM domain to request a DVM operation, and where the DVM node of the first DVM domain is configured to:

send a snoop message to request nodes, other than the first request node, in the first DVM domain in response to receiving the DVM message from the first request node;

send a snoop message to one or more peer DVM nodes in DVM domains other than the first DVM domain in response to receiving the DVM message from the first request node; and send a completion message to the first request node in response to receiving snoop responses from the request nodes, other than the first request node, in the first DVM domain, and receiving snoop responses from the one or more peer DVM nodes.

10. The data processing network of claim 9, where a DVM node of the plurality of DVM nodes includes:

a first message buffer for one or more DVM messages received from request nodes in the DVM domain of the DVM node; and a second message buffer for snoop messages received from DVM nodes other DVM domains, where the DVM node is configured to send a buffer identifier message to the first request node in response to receiving the DVM message from the first request node, the buffer identifier message identifying an available first buffer of the DVM node, and where the first request node is configured to send a target address in the distributed virtual memory to the DVM node in response to receiving the buffer identifier message from the DVM node.

11. The data processing network of claim 10, where the snoop messages sent to the request nodes, other than the first request node, in the first DVM domain and the snoop messages sent to peer DVM nodes include the target address.

12. The data processing network of claim 11, where a peer DVM node is configured to:

send a snoop message to request nodes in the DVM domain of the peer DVM node;

collect snoop responses from the request nodes in the DVM domain of the peer DVM node; and send a snoop response to the DVM node of the first DVM domain.

13. The data processing network of claim 9, where the plurality of request nodes, the plurality of DVM nodes, the assignment logic and the interconnect fabric are fabricated in a first integrated circuit.

14. The data processing network of claim 13, where the first integrated circuit further comprises a first chip-to-chip gateway operatively coupled to a first DVM node of the plurality of DVM nodes.

15. The data processing network of claim 14, where the DVM node of the first DVM domain of the first integrated circuit is configured to:

send a snoop message for the DVM operation to a DVM node of a second integrated circuit, where the snoop message is sent via the first chip-to-chip gateway of the first integrated circuit and a second chip-to-chip gateway of the second integrated circuit; and receive a snoop response from the DVM node of the second integrated circuit via the second chip-to-chip gateway and the first chip-to-chip gateway to indicate completion of the DVM operation by request nodes in the second integrated circuit.

16. The data processing network of claim 15, further comprising a second integrated circuit, the second integrated circuit including:

a plurality of second request nodes, each second request node including a local memory, the local memories of the plurality of request nodes of the first integrated circuit and the plurality of second request nodes of the second integrated circuit accessible as a distributed virtual memory;

a plurality of second DVM nodes;

second assignment logic;

second interconnect fabric, and a second chip-to-chip gateway, operatively coupled to a second DVM node of the plurality of second DVM nodes and to the first chip-to-chip gateway of the first integrated circuit, where the DVM node in the first DVM domain of the first integrated circuit is configured to send a snoop message for the DVM operation to the second DVM node of the second integrated circuit via the first chip-to-chip gateway and the second chip-to-chip gateway, and
where the second DVM node of second first integrated circuit is configured to:
- receive the snoop message from the DVM node of the first DVM domain of the first integrated circuit,
- send snoop messages for the DVM operation to second request nodes of the second integrated circuit,
- collect snoop responses from the second request nodes of the second integrated circuit, and
- send a single snoop response the DVM node of the first integrated circuit, via the second chip-to-chip gateway and the first chip-to-chip gateway, to indicate completion of the DVM operation by the second request nodes in the second integrated circuit.

17. The data processing network of claim 9, where a request node of the plurality of request node includes:
- a fully coherent master device; or
- an input/output coherent master device.

18. The data processing network of claim 9, where a first DVM node is configured to restrict a number of outstanding snoop messages sent to peer DVM nodes.

19. The data processing network of claim 9, where a first DVM node is configured to:
- receive DVM messages for synchronous DVM operations from a plurality of request nodes in the first DVM domain.

20. The data processing network of claim 19, where the first DVM node is further configured to:
- send snoop messages for the synchronous DVM operations one a time to request nodes and peer DVM nodes.

* * * * *